United States Patent [19]

Staege

[11] 4,159,201
[45] Jun. 26, 1979

[54] PROCESS FOR PRODUCING A CARBON MONOXIDE-RICH GAS

[75] Inventor: Hermann Staege, Essen, Fed. Rep. of Germany

[73] Assignee: Krupp-Koppers GmbH, Essen, Fed. Rep. of Germany

[21] Appl. No.: 858,818

[22] Filed: Dec. 8, 1977

[30] Foreign Application Priority Data

Dec. 18, 1976 [DE] Fed. Rep. of Germany ....... 2657598

[51] Int. Cl.² .............................................. C22B 5/12
[52] U.S. Cl. ........................................ 75/91; 48/202; 75/35; 75/42; 423/415 A
[58] Field of Search ..................... 75/34, 35, 41, 42, 91; 48/202; 423/415 A

[56] References Cited

U.S. PATENT DOCUMENTS

| 3,853,538 | 12/1974 | Nemeth | 75/35 |
| 3,988,425 | 10/1976 | Jockel et al. | 423/415 A |
| 4,060,397 | 11/1977 | Buiter et al. | 48/202 |

Primary Examiner—M. J. Andrews
Attorney, Agent, or Firm—Michael J. Striker

[57] ABSTRACT

A carbon monoxide-rich gas of a carbon monoxide concentration of at least 98% by volume is produced by
 [a] generating a hydrogen and carbon monoxide-containing crude gas by gasification of a finely divided solid fuel, including dust-like fuel, with oxygen or oxygen-enriched air and steam;
 [b] desulfurizing the crude gas;
 [c] removing any carbon dioxide present in the crude gas by a selective wash;
 [d] subjecting the thus-treated crude gas to a low temperature decomposition into a carbon monoxide fraction, a hydrogen fraction and a fraction constituted by the residual gases;
 [e] carrying out an endothermal catalytic conversion of the hydrogen fraction by reaction with the carbon dioxide removed in step [c] from the crude gas, the carbon monoxide-rich gas occurring in said conversion reaction, after elimination of the condensate, being recycled into the crude gas at a place preceding said carbon dioxide removal (step [c]), while
 [f] recovering the formed carbon monoxide-rich gas fraction for further use and discharging the residual gas fraction into the atmosphere. The process permits to use solid fuels instead of the gaseous or liquid hydrocarbons usually used in prior art processes.

6 Claims, 2 Drawing Figures

PROCESS FOR PRODUCING A CARBON MONOXIDE-RICH GAS

BACKGROUND OF THE INVENTION

The present invention relates to a process for producing a carbon monoxide-rich gas with a carbon monoxide contents of at least 98% by volume by means of an endothermal catalytic conversion of hydrogen with carbon dioxide.

The so-called conversion reaction $$CO + H_2O \rightleftharpoons CO_2 + H_2 - \Delta H$$

which is an equilibrium reaction results in a shifting of the equilibrium to the right at decreasing temperatures and to the left at increasing temperatures. For this purpose carbon monoxide which is present in the starting gas is reacted with steam to form carbon dioxide and hydrogen in the presence of suitable catalysts. The formed carbon dioxide can then be removed from the gas current by a washing operation. As appears the equilibrium in this case is shifted from the left to the right and the released heat of reaction is discharged by the steam which is used in the reaction in an excess.

There are, however, also situations where a carbon monoxide-rich gas is required for instance as a reduction gas or as an oxosynthesis gas. One has accordingly already attempted to make use of the conversion reaction in the reverse direction.

For instance from the French Pat. No. 1,410,951 a process is known for making oxosynthesis gas in which in a first stage natural gas is catalytically split into a hydrogen-rich gas. The latter is then further reacted with a mixture of carbon dioxide and oxygen. The amount of added oxygen is such that a catalytic combustion is maintained to the extent that it is necessary to furnish the required heat of reaction which causes the equilibrium of the conversion reaction to be shifted from the right to the left, that is, towards the side of the carbon monoxide. Thus, a complete conversion of the carbon dioxide in the second stage of the process is accomplished.

Processes are also known in which the production of carbon monoxide-rich gases is effected by the endothermal catalytic reaction of hydrogen with carbon dioxide according to the above conversion reaction. However, in these cases the starting products were always gaseous or liquid hydrocarbons which usually were first subjected to a preliminary cleavage in order to obtain a hydrogen containing gas which then was further reacted with carbon dioxide.

As distinguished from these processes, the present invention has the object to provide for a process which permits the use of fine grained and even dust-like fuels, particularly coal dust as starting material for the production of a carbon monoxide-rich gas.

SUMMARY OF THE INVENTION

This object is met by a process which combines the following steps:

[a] generating a hydrogen and carbon monoxide-containing crude gas by gasification of a finely divided solid fuel, including dust-like fuel, with oxygen or oxygen-enriched air and steam;
[b] desulfurizing the crude gas;
[c] removing any carbon dioxide present in the crude gas by a selective wash;
[d] subjecting the thus-treated crude gas to a low temperature decomposition into a carbon monoxide fraction, a hydrogen fraction and a fraction constituted by the residual gases;
[e] carrying out an endothermal catalytic conversion of the hydrogen fraction by reaction with the carbon dioxide removed in step [c] from the crude gas, the carbon monoxide-rich gas occurring in said conversion reaction, after elimination of the condensate, being recycled into the crude gas at a place preceding said carbon dioxide removal (step [c]), while
[f] recovering the formed carbon monoxide-rich gas fraction for further use and discharging the residual gas fraction into the atmosphere.

If the produced carbon monoxide gas is intended for use in an ore reduction operation the process of the invention can further be linked up with a step where the blast furnace exhaust gas (top gas) from the ore reduction is subjected to a carbon dioxide wash. The thus separated carbon dioxide can then be used either totally or partly as a further component for the endothermal conversion of the hydrogen fraction (step [e] of the above summary). The exhaust gas which is separated from the carbon dioxide can then be recirculated into the ore reduction in view of its high carbon monoxide contents and can thus be turned to further use.

For the generation of the necessary crude gas it is preferable to subject the fine grained and including dust-like fuel which may be mineral coal or brown coal, lignite, coke or pitch, to a gasification (partial oxidation) at a pressure of 1.02 to 80 bar and a temperature of 800° to 2000° C. For this operation which in itself is conventional, the Koppers-Totzek gasifier has been found to be of particular usefulness. However, it is possible, also, to use other gasifiers of known construction.

If the initial fuel is coal, preferably about 80–90% of the coal has a grain size of about 0.1 mm; about 10–20% has a grain size larger than about 0.1 mm.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILS OF THE INVENTION AND PREFERRED EMBODIMENTS

EXAMPLE 1

Figure 1:
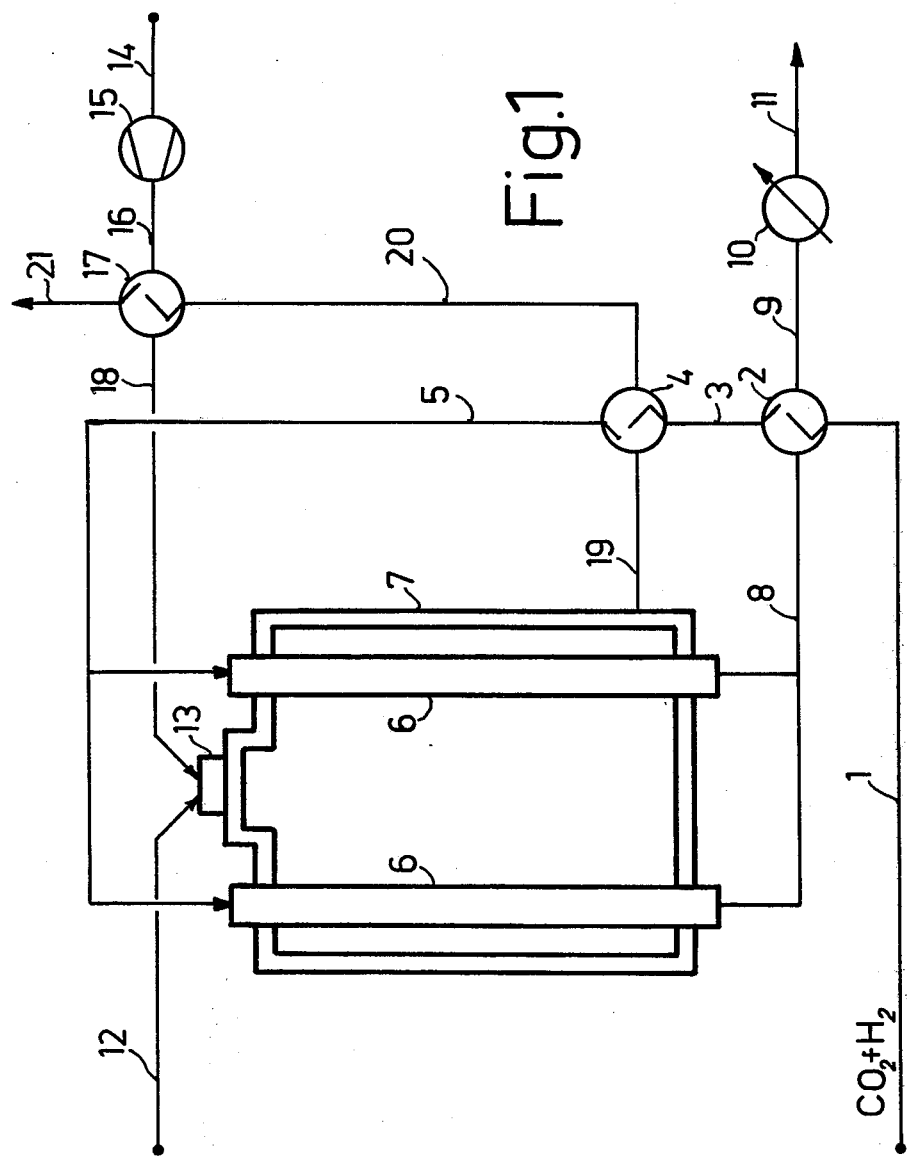
FIG. 1 shows in a simplified and diagrammatic form an installation for use in the endothermal catalytic reaction of hydrogen with carbon dioxide (step [e] of the above summary.

With reference particularly to the drawing of FIG. 1 it is noted that the initial gas mixture of hydrogen and carbon dioxide is introduced into the apparatus by the duct 1. Its composition may vary depending on the starting product and the conditions of the gasification. It may e.g. be composed of 40 to 65% by volume of CO, 5–15% by volume of $CO_2$ and 25–55% by volume of $H_2$. The gas is preheated in the heat exchanger 2° to about 500° C. by means of hot reaction gas. The gas mixture then flows through the duct 3 into the heat exchanger 4 where it is further heated by means of flue gas to the conversion temperature of about 600° C. Subsequently it is passed through duct 5 to the reaction tubes 6 of the furnace 7. The reaction tubes are filled with catalysts in the presence of which the endothermal catalytic conversion of the hydrogen by reaction with carbon dioxide according to the above equation takes place.

The catalysts are conventional conversion catalysts, that is they are of the type normally used for the conversion of carbon monoxide with steam to obtain carbon dioxide and hydrogen. This type of catalyst contains iron oxides or copper or zinc compounds which are catalytically active and, depending on the applied reaction temperature, can cause the equilibrium of the conversion reaction to shift either to the right or to the left.

The hot reaction gas leaves the reactor tubes 6 by the duct 8 and passes part of the sensible heat to the feed gas in the heat exchanger 2. It then is passed through the duct 9 to the condenser 10 where it is further cooled so that the water vapor which has formed during the reaction is subject to condensation.

The carbon monoxide-rich gas which has thus been treated in then discharged by the duct 11 for further use.

The necessary heat of reaction is supplied to the reactor tubes 6 by hot flue gas. The fuel for the flue gas generation is passed to the burner 13 by means of the duct 12. The required combustion air is obtained by suction through duct 14, is then condensed in the blower 15, passed through the duct 16 and heated in the heat exchanger 17 by means of flue gas. It then is passed through duct 18 to the burner 13.

The flue gas which is generated during the combustion leaves the furnace 7 through the duct 19 and heats the feed gas in the heat exchanger to about 600° C. as already noted. It then is passed on through duct 20, and heat exchanger 17 and is finally passed into the atmosphere through duct 21.

EXAMPLE 2

Figure 2:
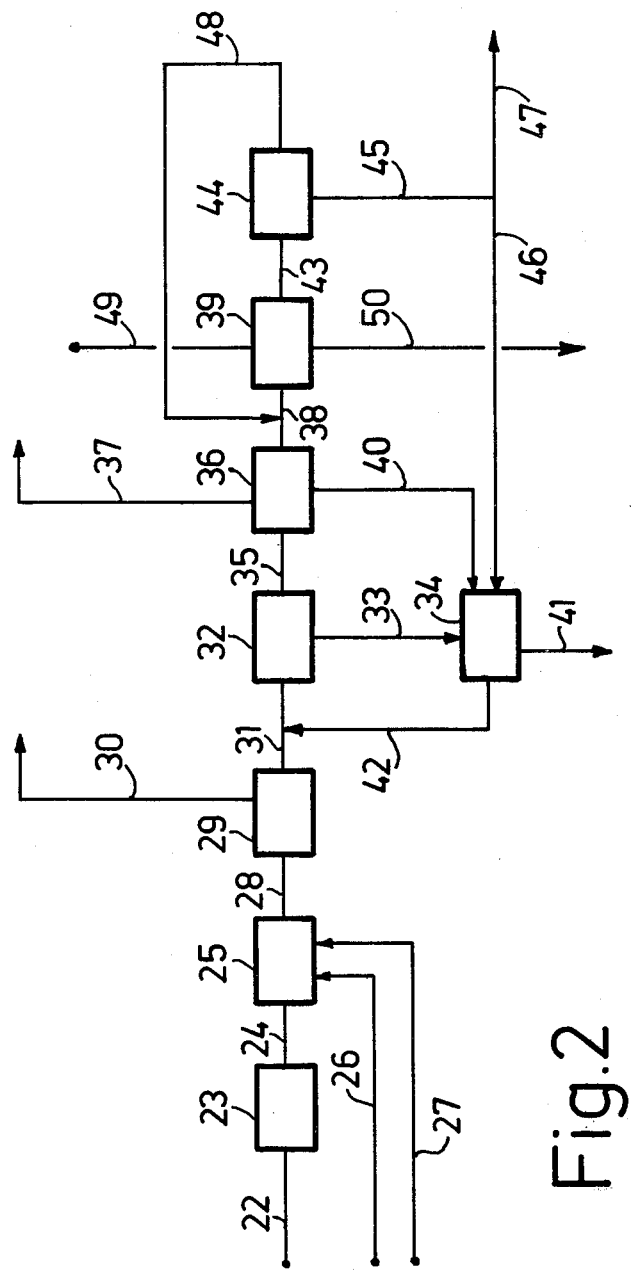
FIG. 2 illustrates in the form of a flow sheet a specific example stating the amounts of material required and obtained in the process of the invention as compared with a prior art process.

With reference now to FIG. 2 this is a flow sheet of a specific embodiment of the invention, exemplifying the invention by way of specific input and output figures.

In this embodiment the object is the production of a carbon monoxide-rich gas from coal in order to employ the gas for ore reduction. The flow sheet shows only those stages and installations which are necessary to illustrate the essential elements of the process. Secondary apparatus features which do not immediately concern the process itself have not been illustrated. Likewise, the physical structure used in the individual process stages has been left out of consideration.

The steps in this case were as follows:

Coal was introduced into the installation by way of conveyor means 22 in an amount of 11.2 t/h. The preparation of the coal was effected at 23 to obtain a grain size of about 0.1 mm as well as a residual water contents of 2%. The thus prepared coal was then passed through duct 24 into the gasifier 25. This was a so-called Koppers-Totzek gasifier.

Oxygen was introduced into the gasifier by duct 26 in an amount of 6,475 $Nm^3/h$.

Simultaneously steam was introduced through the duct 27 in an amount of 2500 kg/h. The crude gas formed in the gasifier by partial oxidation of the coal had the following composition:

11.9 vol.—% $CO_2$
55.9 vol.—% CO
29.0 vol.—% $H_2$
1.1 vol.—% $H_2S$ and other compounds
0.1 vol.—% $CH_4$
2.0 vol.—% $N_2 + Ar$ This gas was compressed in a compressor (not shown) to about 30 at. above atmospheric and was then passed into the desulfurizer 29 in an amount of 18,500 $Nm^3/h$.

The gaseous sulfur compounds ($H_2S + COS$) were washed out of the crude gas by conventional means. The separated sulfur compounds were withdrawn via duct 30 in order to permit either to recover the sulfur in a Claus furnace (not shown) or to obtain sulfuric acid in a sulfuric acid plant.

The desulfurized crude gas was passed through duct 31 to the carbon dioxide wash 32. There the carbon dioxide was separated by chemical or physical absorption in a wash solution. Usually, the wash is effected by means of hot potash, triethanolamine or monoethanolamine at about 30 atm and a temperature which depends on the cooling rate of the gas and may be between 30° and 120° C.

The separated carbon dioxide, after being separated from the wash solution, was then introduced by duct 33 into the device 34 in which the endothermal catalytic reaction with the hydrogen was effected.

The crude gas from which the carbon dioxide had been removed was meanwhile passed through duct 35 to the low temperature decomposition device 36. In this device separation was carried out at a pressure of about 30 atm. and a temperature of about −180° to −185° C. or at still lower temperatures so as to obtain a carbon monoxide, a hydrogen and a residual gas fraction. This last fraction was discharged directly into the atmosphere through duct 37. It contained essentially only the components $CH_4$, $N_2$ and Ar. The carbon monoxide fraction was passed through duct 38 to the reducer 39 while the hydrogen fraction passed through duct 40 to the conversion device 34.

In the conversion part of the apparatus the two reaction components, hydrogen and carbon dioxide, were united and subsequently converted to carbon monoxide and water. Further details of this conversion step and apparatus appear from FIG. 1 and the discussion of this figure in the preceding pages.

The steam formed in the conversion reaction, after cooling and condensation, was withdrawn through duct 41. The carbon monoxide-rich gas was passed through duct 42 to duct 31 where it was added to the crude gas flow prior to the carbon dioxide wash at stage 32.

The exhaust gas (top gas) from the blast furnace of the reduction plant 39 was withdrawn through duct 43 and passed into the carbon dioxide wash 44. In this stage the carbon dioxide was washed out in the same manner as described above in connection with the carbon dioxide wash indicated at 32.

The carbon dioxide separated from the wash solution was withdrawn through duct 45 and passed through duct 46 into the device 34 where it formed a part in the endothermal catalytic conversion.

It will be understood that if a complete transfer of the carbon dioxide into the device 34 was not desired or required excess carbon dioxide could also be discharged through the duct 47.

The regenerated exhaust gas meanwhile was recirculated through duct 48 to duct 38 and thus placed in position for further use in the ore reduction. The ore to be reduced was introduced into the reduction plant 39 via duct 39 and the metal product was withdrawn through duct 50.

The total amount of gas passed into the reduction plant 39 through duct 38 in the present case was 15,465 $Nm^3/h$. This carbon monoxide-rich gas had a contents of CO of 98% by volume. The remaining 2% by volume were composed of $H_2$, $N_2$, $CH_4$ and Ar.

There was then carried out a comparative test to determine the economics of the process of the invention. This test proceeded from a produced carbon monoxide amount of 15,000 $Nm^3/h$ which in both alternatives of the test was obtained from a crude coal having a water contents of 10%, an ash contents of 13.5% and a minimum heat value of 6,100 kacl/kg. The coal was gasified in both cases. The yield of crude gas in each case was about 1.65 $Nm^3/kg$ of crude coal.

In the alternative A the desired carbon monoxide was obtained exclusively by a corresponding gas purification and low temperature decomposition. The alternative B illustrates the process of the invention in which additionally carbon monoxide was obtained in the endothermal catalytic reaction of hydrogen and carbon dioxide.

Relevant data regarding the operation in both cases appear from the following table:

|  |  | A | B |
|---|---|---|---|
| Crude gas | $Nm^3/h$ | 26 700 | 18 500 |
| Recycled gas | " | — | 25 200 |
| Gas entering the $CO_2$ wash | " | 26 700 | 43 700 |
| Gas entering the decomposition step | " | 23 933 | 26 665 |
| Amount of $CO_2$ washed out | " | 2 670 | 16 850 |
| Generated amount of CO | " | 15 000 | 15 000 |
| $CO_2$ obtained by the exhaust gas wash | " | — | 3 150 |
| Relative capacities and requirements: |  |  |  |
| Initial coal preparation | % | 100 | 69.3 |
| Gasification of the coal | % | 100 | 69.3 |
| Desulfurization of the crude gas | % | 100 | 69.3 |
| Crude gas compression | % | 100 | 69.3 |
| $CO_2$ wash | % | 100 | 163.7 |
| Gas decomposition | % | 100 | 111.1 |
| Reduction fraction | % | 100 | 100.0 |
| Endothermal conversion | % | — | added |
| $H_2/CO_2$ compression | % | — | added |
| Air decomposition | % | 100 | 69.3 |
| Requirements of crude carbon | kg/h | 16 180 | 11 210 |

These figures show clearly the economical superiority of the process of the invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for producing a carbon monoxide-rich gas of which the carbon monoxide contents is at least 98% by volume, the said process comprising the following steps:

[a] generating a crude gas which contains hydrogen, carbon monoxide, and sulfur and which may also contain carbon dioxide by gasification of a finely divided solid fuel into oxygen or oxygen-enriched air and steam;

[b] desulfurizing the crude gas;

[c] removing any carbon dioxide present in the crude gas by a selective wash;

[d] subjecting the thus-treated crude gas to a low temperature separation into a carbon monoxide fraction, a hydrogen fraction and a fraction constituted by the residual gases;

[e] carrying out an endothermal catalytic conversion of the hydrogen fraction by reaction with the carbon dioxide removed in step [c] from the crude gas, the carbon monoxide-rich gas occurring in said conversion reaction, after elimination of the condensate, being recycled into the crude gas prior to said carbon dioxide removel (step [c]), while

[f] recovering the formed carbon monoxide-rich gas fraction for further use and discharging the residual gas fraction into the atmosphere.

2. The process of claim 1 wherein the endothermal catalytic conversion of the hydrogen fraction with the carbon dioxide (step 1[e]) is carried out in reactors in which the catalyst is placed and which are heated by hot flue gases, passed, together with the required air, into a heating zone surrounding said reactors.

3. The process of claim 1 wherein the carbon monoxide-rich gas is passed to an ore reduction furnace and wherein the exhaust gas from said furnace is subjected to a carbon dioxide wash whereupon the thus-obtained carbon dioxide gas is at least partially added to the endothermal conversion reaction with the hydrogen fraction (claim 1[c]) while the carbon monoxide-rich exhaust gas is recycled into the ore reduction furnace.

4. The process of claim 1 wherein the gasification of the fine grain fuel (claim 1[a]) is carried out at a pressure of 1.02 to 80 bar and a temperature of 800° to 2000° C.

5. The process of claim 1 wherein the endothermal conversion reaction of the hydrogen fraction with the carbon dioxide (claim 1[e]) is carried out at a temperature of 300° to 600° C. in the presence of a catalyst for the reaction.

6. A process for producing carbon monoxide-rich gas, as recited in claim 1, wherein the finely divided solid fuel is a dust-like fuel.

* * * * *